(12) United States Patent
Solheim (10) Patent No.: US 6,188,816 B1
(45) Date of Patent: Feb. 13, 2001

(54) FILTER TOPOLOGIES FOR OPTICAL ADD-DROP MULTIPLEXERS

(75) Inventor: Alan G. Solheim, Kanata (CA)

(73) Assignee: Nortel Networks Limited, Montreal (CA)

(*) Notice: Under 35 U.S.C. 154(b), the term of this patent shall be extended for 0 days.

(21) Appl. No.: 09/390,213

(22) Filed: Sep. 8, 1999

(51) Int. Cl.[7] .................................................. G02B 6/28
(52) U.S. Cl. ............................ 385/24; 359/124; 359/127
(58) Field of Search ............................ 385/24; 359/124, 359/127

(56) References Cited

U.S. PATENT DOCUMENTS

| | | | |
|---|---|---|---|
| 5,488,500 | 1/1996 | Glance | 359/127 |
| 5,629,995 | * 5/1997 | Duck | 385/24 |
| 5,712,717 | 1/1998 | Hamel et al. | 359/130 |
| 5,771,112 | * 6/1998 | Hamel | 359/128 |
| 5,778,118 | 7/1998 | Sridhar | 385/24 |
| 6,021,233 | * 2/2000 | Koehler | 385/24 |
| 6,025,941 | * 2/2000 | Srivastava | 359/119 |

* cited by examiner

Primary Examiner—Cassandra Spyrou
Assistant Examiner—Leo Boutsikaris (57) ABSTRACT

A filter topography is possible that can reduce the overall cost of a single Optical Add-Drop Multiplexer (OADM) or a series of OADMs that are within a network. The key is to have one of the wavelengths of a WDM signal being input to a filtering apparatus empty. The filtering apparatus can then with a reduced cost filter the received WDM signal such that a channel at a wavelength adjacent to the empty wavelength is removed and a channel is inserted at the previously empty wavelength. In one implementation of this topology within an OADM, a single filter can be used to perform both filtering operations due to the empty wavelength ensuring no corruption of the removed channel at the adjacent wavelength. In another implementation, the filtering operations are performed by two separate filters that each have asymmetrically reduced tolerances. In either case in which there is a reduced number of filters or reduced tolerances for those filters, a reduction in cost will be found.

28 Claims, 6 Drawing Sheets

FILTER TOPOLOGIES FOR OPTICAL ADD-DROP MULTIPLEXERS

FIELD OF THE INVENTION

This invention relates generally to filter designs and more specifically to both apparatus and network level filter topographies for Optical Add-Drop Multiplexers (OADMs).

BACKGROUND OF THE INVENTION

The amount of information communicated over an optical fiber communication system is increased with the use of optical wavelength division multiplexing. Wavelength Division Multiplexed (WDM) systems employ WDM signals consisting of a number of optical signals at different wavelengths, hereinafter referred to as channels or information carrier signals, to transmit information on optical fiber cables. Each channel is modulated by one or more information signal, resulting in the capability to transmit a significant number of information signals over a single optical fiber cable. It is recognized that although a WDM signal comprises a plurality of wavelengths capable of carrying channels, not all the wavelength must contain a channel.

To facilitate the subtraction and/or addition of particular channels to and/or from the WDM signal at different points within a network, OADMs are employed that consist of a plurality of optical filters. These OADMs are used to selectively extract Channels, hereinafter referred to as drop channels, from a WDM signal while the remaining channels, hereinafter referred to as through channels, travel through. The OADMs can also be used to add channels, hereinafter referred to as add channels, to a WDM signal, using wavelengths that have been vacated as a result of channels being dropped at the OADM in question or at an OADM earlier in the transmission path. Since more than one channel usually needs to be accessed at a network node, multi-channel OADMs are used such that a plurality of channels can be dropped and/or added from and/or to a received WDM signal.

There are a number of different implementations for a multi-channel OADM. One key factor that must be considered when considering different implementations is the cost of the filters that are utilized. Filters increase in cost as their Figure of Merit (FOM) increases, their FOM being a measure of the complexity of the filter. One skilled in the art would understand that the FOM increases as the tolerance of the filter that is used increases. One factor that can cause an increase in the required tolerance is an increase in the ratio of the passband to dead band, described herein below. Hence, when considering the cost of any particular OADM, one must consider the number of filters required and the overall tolerance of those filters.

Figure 1:
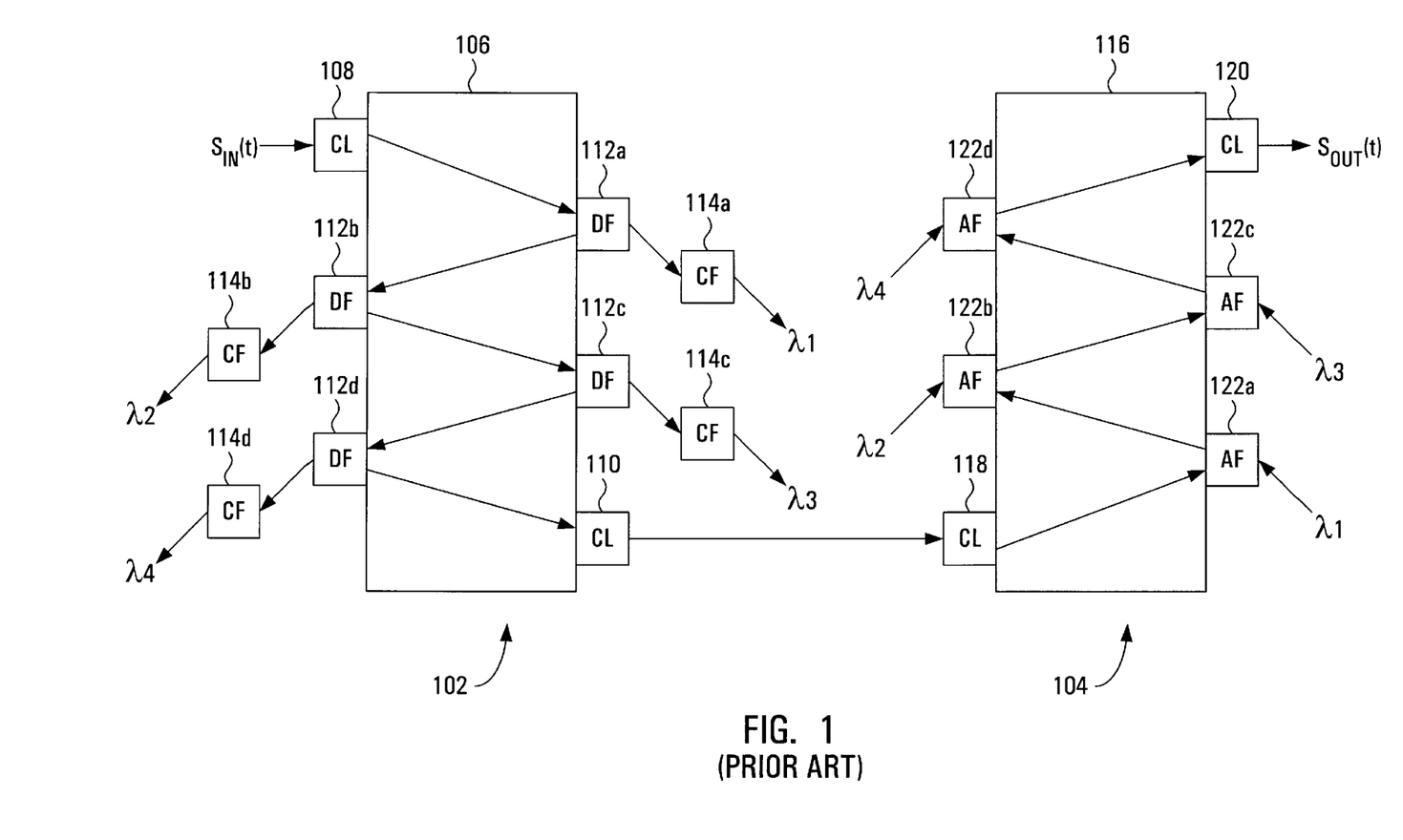
FIG. 1 illustrates a well-known OADM design which utilizes a separate demultiplexer and multiplexer.
Figure 2:
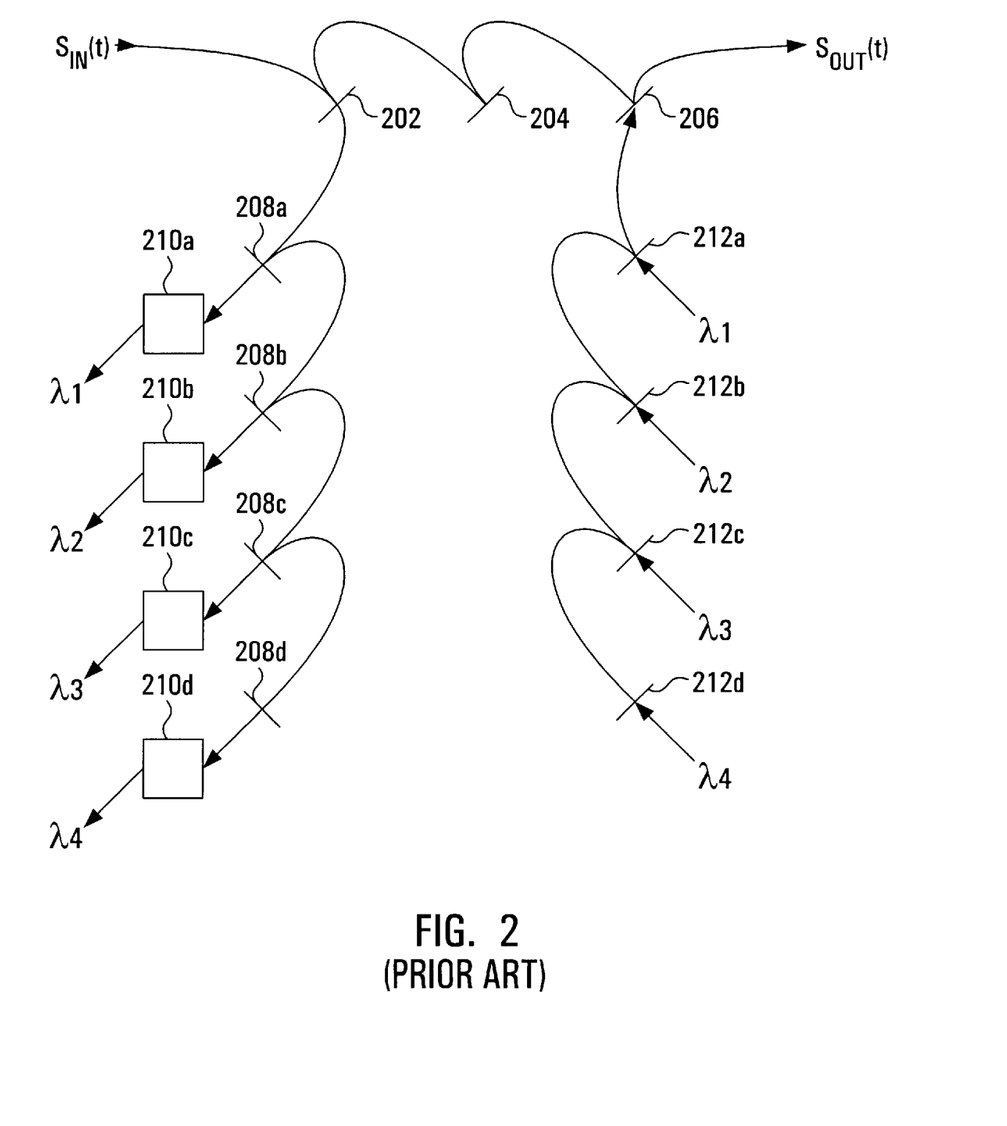
FIG. 2 illustrates a well-known band OADM.

With reference to FIGS. 1 and 2, well-known implementations for OADMs are now described. Firstly, FIG. 1 depicts an OADM that comprises a separate channel demultiplexer 102 and channel multiplexer 104. For this OADM implementation, the demultiplexer 102 extracts channels from a WDM signal while the multiplexer 104 inserts channels within the WDM signal output from the demultiplexer 102.

The channel demultiplexer 102, in this case with four channels to be dropped, comprises a first alignment block 106, first and second columnating lenses (CL) 108,110, first, second, third and fourth drop filters (DF) 112a,112b,112c, 112d and first, second, third and fourth clean-up filters (CF) 114a,114b,114c,114d. The alignment block 106 is utilized to ensure that beams of light being transmitted between the filters and columnating lenses are aligned properly for optimal performance. The first columnating lens 108 receives an input WDM signal $S_{IN}(t)$ in a form capable of being transmitted on a fiber optic cable, transforms the signal into an extended beam signal, and transmits the extended beam WDM signal in the direction of the first drop filter 112a. In the example being shown in FIG. 1, the drop filter 112a receives the extended beam WDM signal, filters out a channel at wavelength λ1 with the use of a single wavelength filter, and forwards the remainder of the extended beam WDM signal onto the next drop filter 112b. The isolation of the channel at wavelength λ1 is not perfect and so an additional filter may be required to ensure that only the required channel is sent on for further processing, in this case this is done with the first clean-up filter 114a. Additional pairings of drop and clean-up filters proceed within the channel demultiplexer 102 of the OADM, each operating similar to that of the first drop and clean-up filters 112a,114a but for different wavelengths (λ2,λ3,λ4). In the case depicted in FIG. 1, after four drop filters the resulting extended beam WDM signal is received by the second columnating lens 110 which converts the signal to a form transmittable over fiber optic cable. The signal output from the second columnating lens 110, although not carrying the channels that were dropped within the demultiplexer 102 of the OADM, still may contain channels at other wavelengths.

The channel multiplexer 104 of the OADM of FIG. 1 comprises a second alignment block 116, third and fourth columnating lenses 118,120 and first, second, third and fourth add filters 122a,122b,122c,122d. The second alignment block 116 operates in a similar manner to the first alignment block 106, as do the third and fourth columnating lenses 118,120 with respect to the first and second columnating lenses 108,110 respectively. Each of the add filters 122a,122b,122c,122d are single wavelength filters that insert channels at the wavelengths λ1, λ2, λ3, and λ4 respectively. An output WDM signal $S_{OUT}(t)$ that is similar to the input WDM signal $S_{IN}(t)$ but with different channels at wavelengths λ1 through λ4 is transmitted from the fourth columnating lens 120.

With the separate channel demultiplexer and multiplexer 102,104, a large number of filters are required. For each of the drop channels, two single wavelength filters are required, while for each of the add channels, one single wavelength filter is needed. For the case shown in FIG. 1 with four channels being dropped and then subsequently added, twelve single wavelength filters are used. In general, it can be seen that for N channels being dropped and added, 3N single wavelength filters are required. In addition, if higher through isolation is required, an additional single wavelength filter per wavelength would be required. This would bring the total to 4N single wavelength filters required for this design.

There are other well-known implementations for the OADM depicted within FIG. 1 that would result in a similar number of filters being required. One such implementation does not utilize the alignment blocks 106,116, but rather has columnating lenses on either side of each filter element. Instead of the WDM signal being transported from filter to filter within extended beam format, fiber optic cable is used.

Another well-known implementation for an OADM is a band OADM as depicted within FIG. 2. In this implementation, an input WDM signal $S_{IN}(t)$ is received at a first band filter 202 which extracts a band of wavelengths, in this case wavelengths λ1 through λ4, and passes a WDM signal comprising the remaining channels to an isolation filter 204. The isolation filter 204 ensures that no channels are at wavelengths λ1 through λ4 without extracting or inserting any channels at other wavelengths. Subsequently, the isolation filter 204 outputs the resulting WDM signal to a second band filter 206 at which point a band of wavelengths, in this case λ1 through λ4, are inserted, generating an output WDM signal $S_{OUT}(t)$ The channels that are extracted at the first band filter 202 are separated by a series of single wavelength drop filters 208a,208b,208c,208d. These individual channels are then further filtered with respective clean-up filters 212a,212b, 212c,212d and output for further processing. As depicted in FIG. 2, the channels inserted at the second band filter 206 are combined prior to the insertion with the use of a series of single wavelength add filters 212a,212b,212c,212d.

Similar to the OADM of FIG. 1, the band OADM of FIG. 2 has a large number of required filters. As can be seen for the case within FIG. 2, twelve single wavelength filters are required for the drop, clean-up, and add filters along with three four wavelength filters for the first and second band filters 202,206 and the isolation filter 204. In general, it can be seen for the case of a band of N wavelengths being dropped and added, there would be 3N single wavelength filters and three N wavelength filters required.

Figure 3:
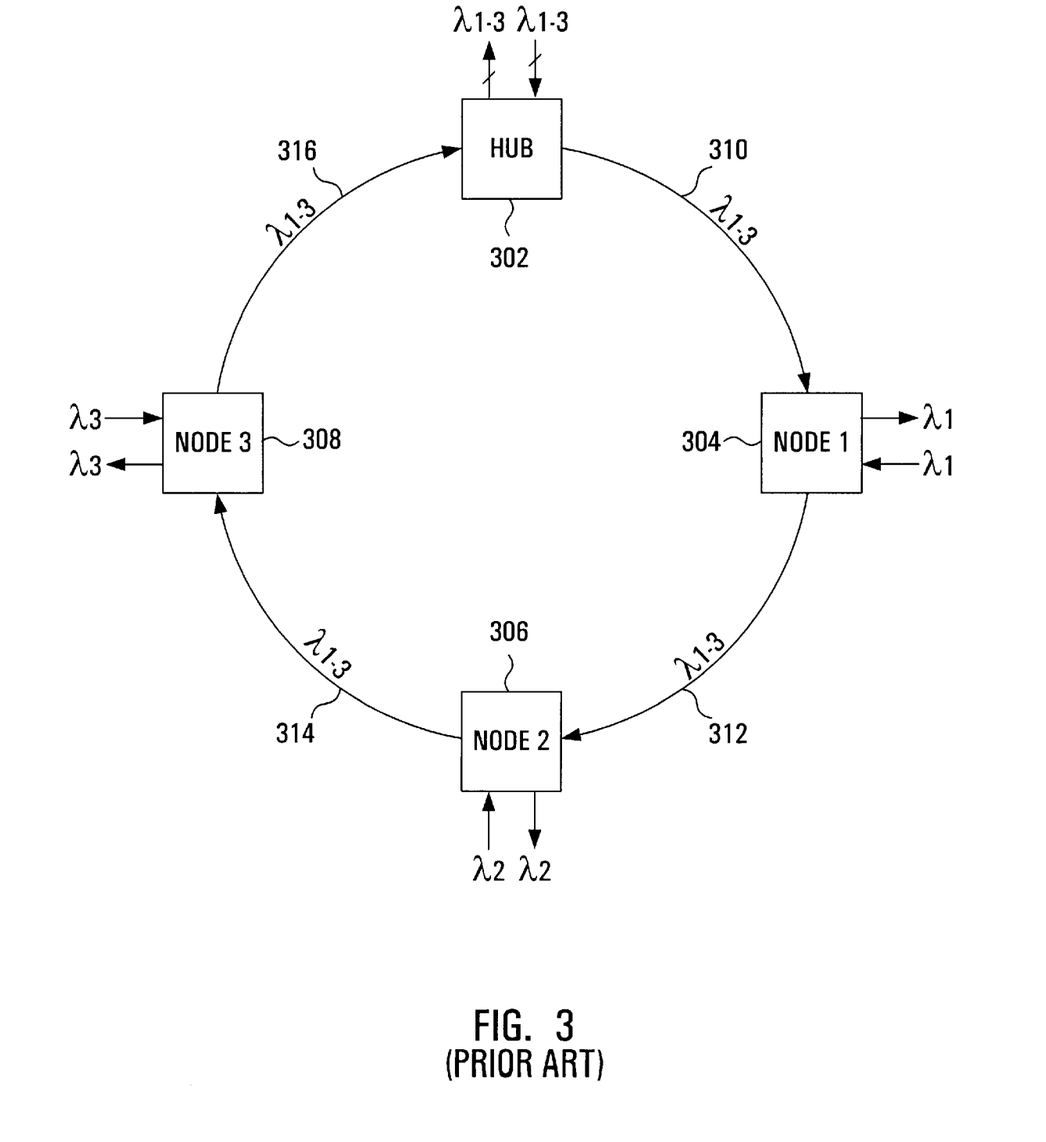
FIG. 3 illustrates a well-known network configuration.

There are some network situations in which only a small number of filters are required in any one OADM. One such well-known network is depicted in FIG. 3. This network comprises a hub 302 and first, second, and third network nodes 304,306,308. As depicted in FIG. 3, the hub 302 communicates independently with each of the nodes 304, 306,308 through the fiber optic cables 310,312,314,316. These cables are connected up within a ring configuration that has all transmissions in one direction. In this case, the hub 302 comprises a multi-channel OADM capable of dropping and adding the channels at wavelengths λ1, λ2, and λ3. The nodes 304,306,308 each comprise a single wavelength OADM for dropping and adding channels at respective wavelengths λ1, λ2, and λ3. Hence, it can be seen that the hub 302 communicates with the first node 304 via the channel at wavelength λ1, the second node 306 via the channel at wavelength λ2, and the third node 308 via the channel at wavelength λ3.

The key difficulty with the network configuration as depicted within FIG. 3 is the cost of the OADM within each of the network nodes. Since the same wavelength that is being dropped is also being added at the same node, the tolerance of the single wavelength filters within the OADMs must be extremely high to prevent cross-talk problems. Alternatively, isolation filters are required.

Since the cross-talk possibility is extremely high in this configuration, a typical solution is to use a first set of channels for transmission from the hub 302 to the nodes 304,306,308 and another set of channels for transmission from the nodes to the hub. For instance, this could be done by using wavelengths λ1, λ2, and λ3 for transmitting data to the respective network nodes 304,306,308, similar to that shown in FIG. 3, and using wavelengths λ4, λ5, and λ6 for transmitting data to the hub 302 from the respective nodes 304,306,308. The key problem with this is that the bandwidth efficiency of the network becomes only 50% as at any one time only half the channels are being used.

A further solution to improve the cost of OADMs is not to insert channels within adjacent wavelengths. Such unused wavelengths, commonly called dead bands, allow a relaxation of the tolerances required for the filters used by decreasing the ratio of passband to dead band. Unfortunately, at the same time as reducing the cost of the filters used by reducing the tolerances needed, the bandwidth efficiency of the overall network is significantly reduced. For every used wavelength there is an unused wavelength, making the efficiency 50%. In situations where the bandwidth of the network is critical such a low bandwidth efficiency is not acceptable.

OADM designs and network configurations of OADMs are required that reduce the overall cost of the network while not limiting the bandwidth efficiency. To accomplish this, the number of filters and the tolerance of the filters must be reduced without significantly sacrificing the limited bandwidth of the network.

SUMMARY OF THE INVENTION

The present invention has specific filter topologies at the apparatus and/or network level of a WDM network to mitigate one or more of the disadvantages with regard to the present invention. The present invention takes advantage of wavelengths within a WDM signal that do not have channels. The key to the present invention is to organize the filters within an apparatus or a network so that a filtering apparatus receives a WDM signal with an empty wavelength. In a first possibility, this allows multiple tasks to be possible during a single filtering operation, such as inserting a channel and removing another channel with a single filter. In a second possibility, the tolerance of filters within the filtering apparatus can be reduced. In either case, the result should be a lower cost due to either a reduced number of filters or reduced tolerances on those filters used.

The present invention, in a first broad aspect, is a method of inserting a channel into a WDM signal. The first step of the method is to receive a first WDM signal that has no channel at a first wavelength. Next, the first WDM signal is filtered so that a channel at a second wavelength adjacent to the first wavelength is removed from the WDM signal and a channel is inserted at the first wavelength. This results in the generation of a second WDM signal. In one preferable embodiment, the filtering of the first WDM signal is done with use of a single filter which has a passband comprising both the first and second wavelengths. In another preferable embodiment, the filtering is done with two filters with passbands comprising the first and second wavelengths respectively that have asymmetrically reduced tolerances.

In a second broad aspect, the present invention is a filtering apparatus that is arranged to implement the method of the first broad aspect. In this case, the filtering apparatus filters the first WDM signal so that a channel at a second wavelength adjacent to the first wavelength is removed from the WDM signal and a channel is inserted at the first wavelength. Further, the filtering apparatus outputs a second WDM signal generated from the filtering of the first WDM signal that has no channel at the second wavelength. Once again, in one embodiment this filtering is done with a single filter while in another embodiment it is done with two filters with lower tolerances.

In other aspects, the present invention is an OADM or a network node that incorporates one or more of the filtering apparatuses of the second broad aspect. In one preferred embodiment, the present invention is an OADM which includes an initial filter, a number of intermediate filters that are consistent with the filtering apparatus of the second broad aspect, and a final filter, the OADM performing both demultiplexing and multiplexing operations on a WDM signal. In another preferred embodiment, the present invention is a network that includes a hub and a number of network nodes that further include a filtering apparatus according to the second broad aspect.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

To reduce the costs of OADMs, either the number of filters required and/or the tolerances needed must be reduced. The key to one preferred embodiment of the present invention is to configure filters within an OADM so that the number of filters can be reduced compared to previous implementations with similar functionality. The key to another of the preferred embodiments of the present invention is to configure the OADMs within a network so as to reduce the required tolerances for the filters within the OADMs of the network nodes.

The configurations described herein below for the preferred embodiments of the present invention utilize the lack of a channel at a particular wavelength, hereinafter referred to as an empty wavelength, as an advantage during a filtering stage for a WDM signal. In a first preferred embodiment, the lack of a channel at a particular wavelength within the received WDM signal allows the filtering stage to remove a channel from a wavelength adjacent to the empty wavelength while inserting a new channel at the previously empty wavelength with the use of only a single filter. In a second preferred embodiment, the existence of an empty wavelength within the received WDM signal allows the next filtering stage to perform the functions of the first preferred embodiment but with two filters of a lower tolerance than previous implementations and hence a lower cost.

An OADM according to the first preferred embodiment described briefly above is now described in detail with reference to FIG. 4. This OADM comprises an alignment block 402, first and second columnating lenses (CL) 404, 406, first and second single wavelength filters (1λ F) 408a, 408b, first, second, and third two wavelength filters (2λ F) 410a,410b,410c, and first, second, third, and fourth clean-up filters (CF) 412a,412b,412c,412d. The alignment block 402 is used to ensure that the filters and columnating lenses remain on two planes that are perfectly parallel, thus allowing for light beams to be properly angled.

The first columnating lens 404 receives an input WDM signal $S_{IN}(t)$ which comprises a plurality of channels at different wavelengths. The columnating lens 404 converts the WDM signal $S_{IN}(t)$ from a form transmitted on a fiber optic cable to an extended beam WDM signal and transmits the extended beam WDM signal to the first single wavelength filter 408a via the alignment block 402.

The single wavelength filter 408a is a three port filter in which a particular channel, in this case at wavelength λ1, is extracted from the extended beam WDM signal and forwarded to the first clean-up filter 412a. The clean-up filter 412a ensures that only the channel at wavelength λ1 is sent for processing while any other wavelengths extracted unintentionally at the first single wavelength filter 408a are removed. The resulting extended beam WDM signal with the channel at wavelength λ1 removed is reflected at the first single wavelength filter 408a and transmitted via the alignment block 402 to the first two wavelength filter 410a. This resulting WDM signal, although comprising the same wavelengths as the WDM signal received at the first single wavelength filter 408a, is in fact a different WDM signal since it contains different channels. For simplicity, the WDM signals generated between filters in the OADM of FIG. 4 are herein below referred to as intermediate WDM signals.

Figure 4:
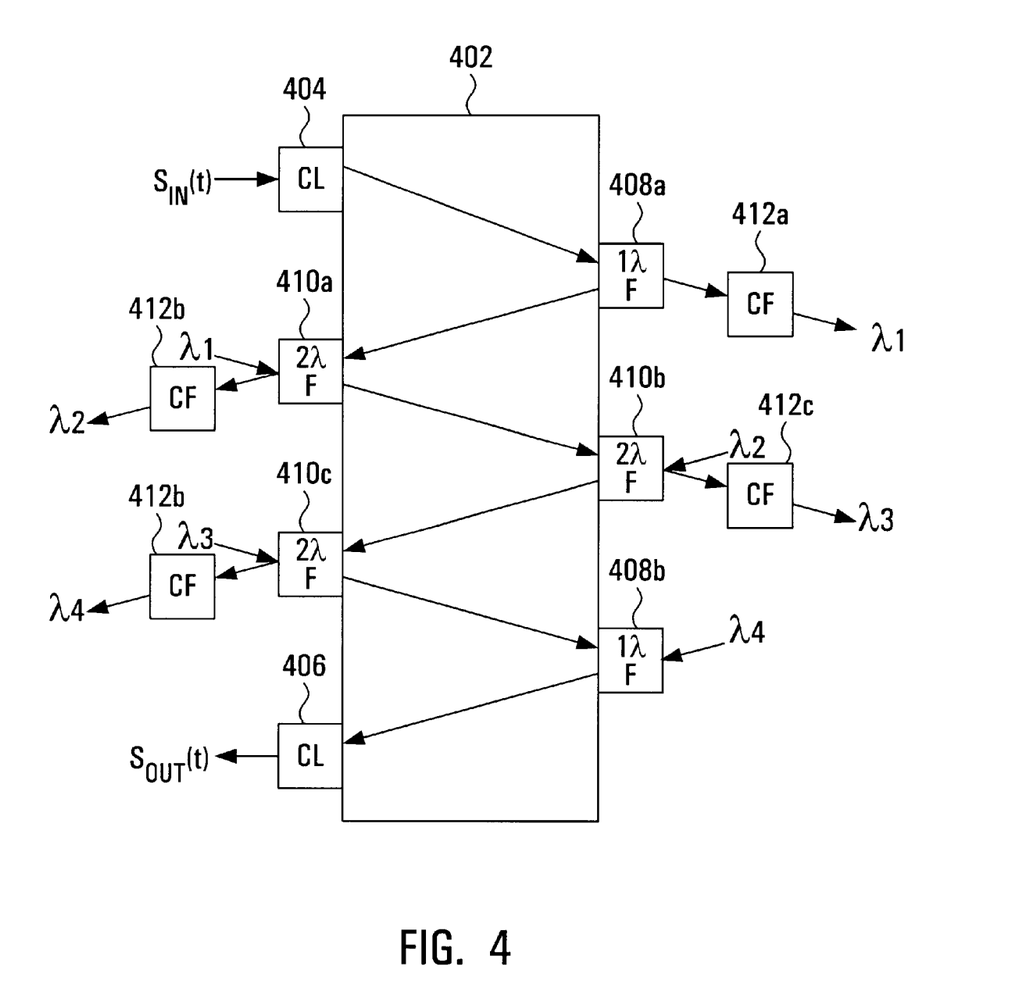
FIG. 4 illustrates an OADM design according to a preferred embodiment of the present invention.

The first two wavelength filter 410a is a four port filter that receives the intermediate signal output from the filter 408a and filters it such that a particular channel, at wavelength λ2 in FIG. 4, is extracted while a channel is inserted at the wavelength removed at the previous filter 408a, in this case wavelength λ1. Similar to the operation of the first clean-up filter 412a, the second clean-up filter 412b is used to further filter the extracted channel at wavelength λ2. The insertion of the channel at wavelength λ1 is possible with the same filter as the extraction of the channel at wavelength λ2 since the wavelengths are adjacent and the channel at wavelength λ1 has previously been removed and so will not contaminate the extraction of the channel at wavelength λ2. With a passband that comprises both wavelength λ1 and λ2, the first two wavelength filter 410a can filter off the channels at these wavelengths from the received intermediate WDM signal, in this case only the channel at wavelength λ2 remains, and can insert channels at these wavelengths, in this case a channel at wavelength λ1. If a channel was also inserted for wavelength λ2, cross-talk problems could result with the inserted channel at wavelength λ2 also being extracted. The end result of these operations is an outputting of a further intermediate WDM signal.

The second and third two wavelength filters 410b,410c and third and fourth clean-up filters 412c,412d operate in a similar manner as the first two wavelength filter 410a and the second clean-up filter 412b respectively. The second two wavelength filter 410b and third clean-up filter 412c operate together to extract the channel at wavelength λ3 and insert a channel at wavelength λ2. The third two wavelength filter 410c and fourth clean-up filter 412d operate together to extract the channel at wavelength λ4 and insert a channel at wavelength λ3. After these filters, the second single wavelength filter 408b receives the intermediate WDM signal output from the third two wavelength filter 410c and inserts a channel at wavelength λ4, the wavelength that corresponds to the channel removed at the filter 410c. The resulting WDM signal is then reflected to the second columnating lens 406 which converts the signal into a form that can be transmitted along a fiber optic cable as output WDM signal $S_{OUT}(t)$.

The key to the preferred embodiment OADM of FIG. 4 is the removal of a channel at a wavelength directly prior to the insertion of a channel at the same wavelength. The same filter (a four port two wavelength filter) may be used for the insertion of a channel at the previously extracted wavelength and the extraction of a channel at an adjacent wavelength.

There are a number of problems with this embodiment, but the advantages as will be described herein below in most cases out way these problems. One problem with the embodiment of FIG. 4 is the difficulty of aligning the four port filters required to be used for the two wavelength filters. Another problem is the increased cost required with the use of these two wavelength filters due to the increased passband needed, that being a passband wide enough for two wavelengths.

There are a number of important advantages of the OADM as depicted in FIG. 4 over the previous implementations. For one, the number of filters is significantly reduced. It can be seen in FIG. 4 that only nine filters were required to operate an OADM for four wavelengths while in the OADM implementations of FIGS. 1 and 2 twelve and fifteen filters were needed respectively. In general, with N wavelengths being extracted and inserted within the embodiment of FIG. 4, it can be seen that 2N+1 filters would be required. Therefore, as the number of wavelengths requiring extraction and insertion increases, the advantages of the preferred embodiment of FIG. 4 increase since the OADM implementations of FIGS. 1 and 2 require 3N and 3N+3 filters respectively. A further advantage of the preferred embodiment of FIG. 4 is that no dead bands are required. This results in a higher bandwidth efficiency compared to network topologies that use dead bands. Yet further, the preferred embodiment of FIG. 4 allows for lower through loss when compared to a single channel ADM cascade as depicted within FIG. 1. In FIG. 4, only five filter bounces are required for a four channel add/drop functionality while in FIG. 1, eight filter bounces are needed for similar functionality.

There are numerous alternative embodiments possible for the preferred embodiment depicted in FIG. 4. For one, although the preferred embodiment of FIG. 4 is depicted using an alignment block 402 and an extended beam signal, the present invention could be implemented in a 3 and 4 port design in which fiber optic cable connects the individual filters of the OADM with additional columnating lenses included on either side of each filter. Further, although the embodiment depicted in FIG. 4 utilizes clean-up filters, these filters are not required in embodiments in which the filters extracting the channels are of sufficiently high tolerance. Yet further, although the OADM of FIG. 4 operates to extract and insert four wavelengths, this is not meant to limit the scope of the present invention. More or less wavelengths can be extracted and/or inserted while still implementing an OADM of the preferred embodiment of FIG. 4. The key to this embodiment is that a WDM signal is received at a filter with an empty wavelength, and the single filter subsequently can extract a channel at a wavelength adjacent to the empty wavelength at the same time as inserting a channel at the previously empty wavelength.

The second preferred embodiment of the present invention is now described with reference to FIGS. 5 and 6. In this embodiment, the principles of the present invention are applied on a network level as will be described herein below. The network depicted within FIG. 5 comprises a communication hub 502 and first, second, and third network nodes 504,506,508. The hub 502 and the network nodes 504,506, 508 together make a ring configuration with a first fiber optic cable 510 coupled between the hub 502 and the first node 504, a second fiber optic cable 512 coupled between the first and second nodes 504,506, a third fiber optic cable 514 coupled between the second and third nodes 506,508, and a fourth fiber optic cable 516 coupled between the third node 508 and the hub 502. In operation, a WDM signal with at least four channels (at wavelengths $\lambda 1, \lambda 2, \lambda 3, \lambda 4$) is transmitted through the ring created with the hub 502 and the nodes 504,506,508.

Figure 5:
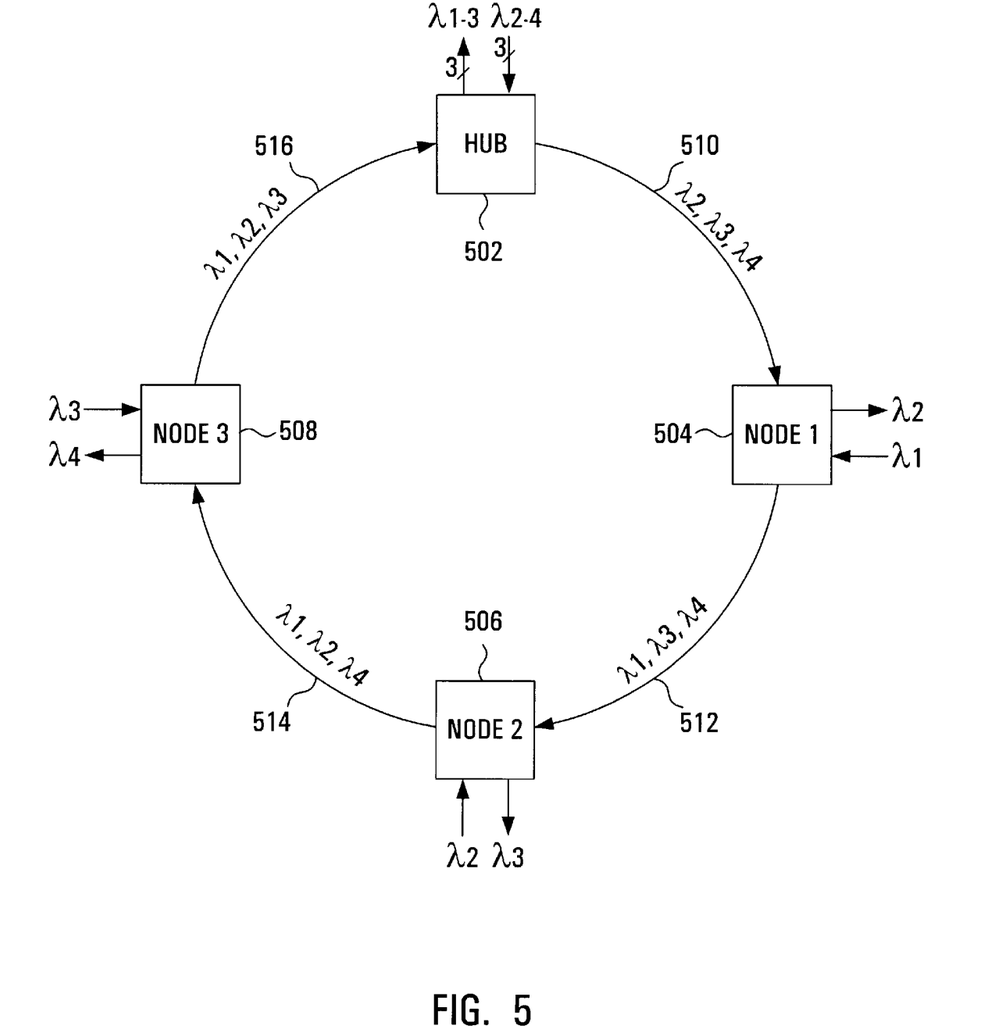
FIG. 5 illustrates a block diagram for a network configuration according to a preferred embodiment of the present invention.

In the configuration of FIG. 5, the hub 502 transmits data to the first, second and third nodes 504,506,508 within channels at respective wavelengths $\lambda 2$, $\lambda 3$ and $\lambda 4$, and receives data from the first, second and third nodes 504,506, 508 within channels at respective wavelengths $\lambda 1$, $\lambda 2$ and $\lambda 3$. Hence, the first, second, third and fourth fiber optic cables 510,512,514,516 have WDM signals that comprise channels at wavelengths $\lambda 2,3,4$, $\lambda 1,3,4$, $\lambda 1,2,4$ and $\lambda 1,2,3$ respectively transmitted through them. In operation, a channel at wavelength $\lambda 2$ is inserted within a WDM signal by the hub 502 and extracted by the first network node 504. Also, a channel at wavelength $\lambda 1$ is inserted to the received WDM signal at the first node 504 and extracted at the hub 502. Similar operations allow the remaining nodes 506,508 to communicate with the hub 502.

The key to this preferred embodiment of the present invention is the extraction of a channel on a first wavelength by a first network device and then not inserting a new channel on the first wavelength until at a further network device. This results in a distance in which no channel is on a particular wavelength, hence an empty wavelength. In the example shown in FIG. 5, there is no channels at wavelength $\lambda 1$ within the first fiber optic cable 510, no channel at wavelength $\lambda 2$ within the second fiber optic cable 512, no channel at wavelength $\lambda 3$ within the third fiber optic cable 514, and no channel at wavelength $\lambda 4$ within the fourth fiber optic cable 516. These empty wavelengths being transmitted between network devices within the ring configuration allow other wavelengths to be extracted with filters of reduced cost as will be described in detail with reference to FIG. 6.

Figure 6:
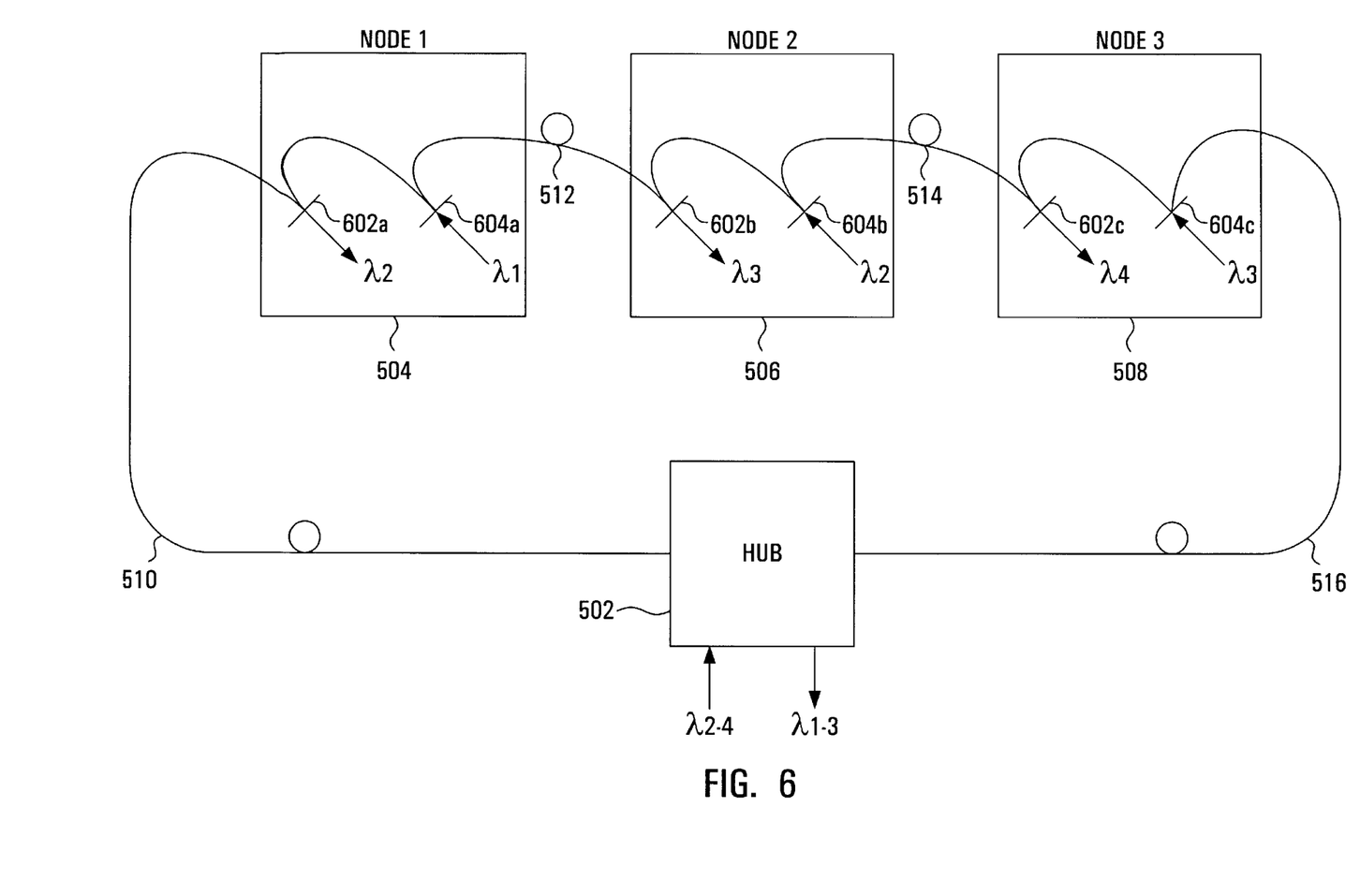
FIG. 6 illustrates a detailed block diagram for the network configuration of FIG. 5.

A block diagram of a preferred embodiment of the network configuration of FIG. 5 is depicted in FIG. 6. In this embodiment, the first, second and third network nodes 504,506,508 each comprise an extraction filter 602a,602b, 602c and an insertion filter 604a,604b,604c. Within the first node 504, the extraction filter 602a removes the channel at wavelength $\lambda 2$ from the WDM signal received at the first node 504 and the insertion filter 604a adds a channel at wavelength $\lambda 1$ to the WDM signal output from the extraction filter 602a. Similarly, within the second and third nodes 506,508, channels at wavelengths $\lambda 3$ and $\lambda 4$ are removed by the extraction filters 602b,602c respectively and channels at wavelengths $\lambda 2$ and $\lambda 3$ are added by the insertion filters 604b,604c respectively.

The configuration of FIGS. 5 and 6 allows for the extraction filters 602a,602b,602c and the insertion filters 604a, 604b,604c to have asymmetrically lower tolerances than would be required in the well-known embodiment depicted in FIG. 3. For example, since the wavelength $\lambda 1$ is empty when the first node 504 receives a WDM signal, the extraction filter 602a for the channel at wavelength $\lambda 2$ can be made with lower tolerances on the $\lambda 1$ side of the filter. A filter that has a passband comprising wavelength $\lambda 2$ and has a tolerance that could pass a portion of a channel at wavelength $\lambda 1$ may be used without significant corruption of the extracted channel since at this point no channel is at wavelength $\lambda 1$. Similarly, the other extraction filters 602b,602c can also have asymmetrically lower tolerances than previous designs would require. The extraction filter 602b can be designed to have a passband comprising wavelength $\lambda 3$ while also having a tolerance that allows any channel at wavelength $\lambda 2$ to be removed as well since, in this case, no channels are at wavelength $\lambda 2$ at this point. For similar reasons, the extraction filter 602c can be designed to have a passband comprising wavelength $\lambda 4$ without fully preventing a channel at wavelength $\lambda 3$ from being removed.

The insertion filters 604a,604b,604c can also have asymmetrically reduced tolerances. The insertion filter 604a for instance can allow a channel at wavelength λ1 to be inserted by having a passband comprising wavelength λ1 while not fully preventing the removal of a channel on wavelength λ2 due to a low tolerance. Since, in the case depicted in FIG. 6, no channel is at wavelength λ2 when inserting a channel at wavelength λ1, there is no need to ensure that filter 604*a* doesn't affect signals at wavelength λ2. This low tolerance on one side of the insertion filter 604*a* could actually be used to ensure the remaining channel at wavelength λ2 has been removed from the WDM signal traversing it. Similar asymmetrical tolerance relaxations can be used with the insertion filters 604*b*,604*c* for wavelength λ3 and λ4 respectively when inserting a channel at wavelengths λ2 and λ3 respectively.

One key advantage of the embodiment depicted in FIGS. 5 and 6 is the reduced costs for the filters as a result of the decrease in the tolerance requirement of the extraction and insertion filters within the network nodes. This embodiment does not affect tolerance requirements of the filters within the hub 502, though an OADM according to the preferred embodiment of the present invention depicted within FIG. 4 could be used within the hub 502 to reduce the number of filters required.

Another advantage of the embodiment of the present invention depicted in FIGS. 5 and 6 is a reduction in the cross-talk within the network, cross-talk being the accidental extraction of a channel at a wavelength other than the wavelength attempting to be extracted from. A sufficiently large reduction in cross-talk can result in the elimination of the need for clean-up filters, hence reducing the cost of the OADMs within the nodes 504,506,508. As well, the reduction in cross-talk can further reduce the through loss.

Similar to the embodiment of the present invention of FIG. 4, the embodiment of FIGS. 5 and 6 further do not require any dead bands. Because of the lack of dead bands, the bandwidth efficiency of the embodiment depicted in FIGS. 5 and 6 is N−1/N where N is the number of wavelengths (one more than the number of network nodes). Within any one fiber optic cable, all but one wavelength is being used for transmission of channels. In the case shown in FIGS. 5 and 6, N equals four and so the efficiency is 75%. Other OADM schemes have bandwidth efficiencies between 50% to 75% and so the network configuration of FIGS. 5 and 6 can result in an increased efficiency, especially as N increases.

The main downside of the network configuration of FIGS. 5 and 6 is the increased complexity caused by planning wavelength allocation. It can be seen that this disadvantage is not as significant as the decreases in cost resulting from this implementation of the present invention.

Although the embodiment of the present invention depicted in FIGS. 5 and 6 is preferable, this is not meant to limit the scope of the present invention. For instance, in one embodiment more than one wavelength is extracted and inserted at one or more of the network nodes. In this case, either more than one extraction and insertion filters are used or, in the case of adjacent wavelengths requiring extraction, an extraction filter is used for a band of wavelengths. In this case, more than one wavelength would be empty during the transmission on the fiber optic cables, hence adjusting the calculation with respect to bandwidth efficiency.

Persons skilled in the art will appreciate that there are yet more alternative implementations and modifications possible for implementing the present invention, and that the above implementation is only an illustration of this embodiment of the invention. The scope of the invention, therefore, is only to be limited by the claims appended hereto.

What is claimed is:

1. A method of adding a first channel to and subtracting a second channel from a first Wavelength Division Multiplexed (WDM) signal which comprises a plurality of channels defined by a sequential set of wavelengths except for a first wavelength of the set which has been omitted, the method comprising:

receiving the first WDM signal that has no channel at the first wavelength;

filtering the first WDM signal such that a channel at a second wavelength adjacent to the first wavelength is subtracted from the first WDM signal and a channel is added at the first wavelength; and outputting a second WDM signal that has no channel at the second wavelength after the filtering of the first WDM signal.

2. A method according to claim 1, wherein the filtering of the first WDM signal is done with use of a single filter which has a passband comprising both the first and second wavelengths.

3. A method according to claim 1, wherein the filtering of the first WDM signal such that the channel at the second wavelength is subtracted is done with use of a first filter and the filtering of the first WDM signal such that the channel is added at the first wavelength is done with use of a second filter.

4. A method according to claim 3, wherein the first filter has a passband comprising the second wavelength and a filter tolerance capable of subtracting a channel at the first wavelength.

5. A method according to claim 3, wherein the second filter has a passband comprising the first wavelength and a filter tolerance capable of subtracting a channel at the second wavelength.

6. A method according to claim 1 further comprising generating the first WDM signal by filtering a third WDM signal such that a channel at the first wavelength is subtracted from the third WDM signal.

7. A method according to claim 1 further comprising filtering the channel removed from the second wavelength of the first WDM signal to remove any channels from wavelengths other the second wavelength.

8. A method according to claim 1 further comprising filtering the second WDM signal such that a channel at a third wavelength adjacent to the second wavelength is removed from the second WDM signal and a channel is inserted at the second wavelength.

9. A filtering apparatus arranged to receive a first Wavelength Division Multiplexed (WDM) signal which comprises a plurality of channels defined by a sequential set of wavelengths except for a first wavelength of the set which has been omitted;

wherein the filtering apparatus filters the first WDM signal such that a channel at a second wavelength adjacent to the first wavelength is removed from the first WDM signal and a channel is inserted at the first wavelength, and outputs a second WDM signal generated from the filtering of the first WDM signal that has no channel at the second wavelength.

10. A filtering apparatus according to claim 9 comprising a single filter with a passband comprising both the first and second wavelengths.

11. An Optical Add-Drop Multiplexer (OADM) incorporating the filtering apparatus according to claim 10.

12. An OADM according to claim 11 further comprising a clean-up filter that receives the channel removed by the filtering apparatus at the second wavelength and filters the received channel to remove any channels from wavelengths other than the second wavelength.

13. An OADM according to claim 11 further comprising an initial filter that generates the first WDM signal by filtering a third WDM signal such that a channel at the first wavelength is removed from the third WDM signal.

14. A filtering apparatus according to claim 9 comprising a first filter that generates an intermediate WDM signal by filtering the first WDM signal such that the channel at the second wavelength is removed from the first WDM signal and a second filter that generates the second WDM signal by filtering the intermediate WDM signal such that the channel is inserted at the first wavelength.

15. A filtering apparatus according to claim 14, wherein the first filter has a passband comprising the second wavelength and a filter tolerance capable of removing a channel at the first wavelength.

16. A filtering apparatus according to claim 14, wherein the second filter has a passband comprising the first wavelength and a filter tolerance capable of removing a channel at the second wavelength.

17. A network node incorporating the filtering apparatus according to claim 14 that is arranged to be coupled to other network nodes within a network.

18. A network node according to claim 17, wherein the channel removed from the second wavelength of the first WDM signal comprises data sent from a network hub, and the channel inserted at the first wavelength of the intermediate WDM signal comprises data to be sent to the network hub.

19. An Optical Add-Drop Multiplexer (OADM) arranged to receive a first Wavelength Division Multiplexed (WDM) signal which comprises a plurality of channels defined by a sequential set of wavelengths, the OADM comprising:
an initial filter that generates one of a plurality of intermediate WDM signals by filtering the first WDM signal such that a channel at a first wavelength is removed from the first WDM signal, leaving the first wavelength within the intermediate WDM signal empty;
N-1 intermediate filters that each generate one of the intermediate WDM signals by filtering the previously generated intermediate WDM signal such that a channel at a wavelength adjacent to a previously emptied wavelength is removed from the previously generated intermediate WDM signal and left empty while a channel is inserted at the previously emptied wavelength; and
a final filter that generates a second WDM signal by filtering the previously generated intermediate WDM signal such that a channel is inserted at a wavelength that the previous additional filter had emptied;
wherein N is equal to the number of wavelengths within the sequential set of wavelengths that have channels removed and other channels inserted in order to generate the second WDM signal, N being greater than one.

20. An OADM according to claim 19 further comprising a clean-up filter corresponding to the initial filter and N-1 clean-up filters that each correspond to one of the intermediate filters;
wherein each of the clean-up filters receives the channel removed by the corresponding initial or intermediate filter and removes any channels at wavelengths other than the wavelength specifically targeted for removal by the corresponding initial or intermediate filter.

21. An OADM according to claim 19 further comprising first and second collimating lenses, the first collimating lens arranged to receive the first WDM signal in a first format from a fiber optic cable, convert the first WDM signal into an extended beam format and forward the first WDM signal in the extended beam format to the initial filter, and the second collimating lens arranged to receive the second WDM signal in the extended beam format from the final filter, convert the second WDM signal into the first format and output the second WDM signal in the first format to a fiber optic cable;
wherein each of the intermediate WDM signals traverse from the filter that generated it to the subsequent filter in the extended beam format.

22. An OADM according to claim 21 further comprising an alignment block in which the WDM signals in the extended beam format traverse, the alignment block maintaining the position of the initial filter, intermediate filters and final filter such that the corresponding first, intermediate, or second WDM signals that are received and output from each are at proper angles.

23. An OADM according to claim 19, wherein the initial filter, the intermediate filters and the final filter are coupled in series with each other by fiber optic cables.

24. A network that comprises a hub and at least two network nodes, the network nodes being coupled in a ring configuration with the hub;
wherein each of the network nodes receives from the previous one of the network nodes or the hub within the ring configuration a Wavelength Division Multiplexed (WDM) signal which comprises a plurality of channels defined by a sequential set of wavelengths except for one wavelength of the set which has been omitted, filters the received WDM signal such that a channel at a wavelength adjacent to the omitted wavelength is removed, inserts a channel at the previously omitted wavelength, and outputs to the next one of the network nodes or the hub within the ring configuration a WDM signal modified from the received WDM signal; and
wherein the wavelengths in which a channel is removed is different for each one of the network nodes, and the channels removed by the network nodes comprises data sent from the hub while the channels being inserted by the network nodes comprises data sent to the hub.

25. A network according to claim 24, wherein each of the network nodes comprise a first filter that generates an intermediate WDM signal by filtering the received WDM signal such that a channel at the wavelength adjacent to the omitted wavelength is removed from the received WDM signal and a second filter that generates the modified WDM signal by filtering the intermediate WDM signal such that a channel is inserted at the previously omitted wavelength.

26. A network according to claim 25, wherein the first filter has a passband comprising the wavelength adjacent to the omitted wavelength and a filter tolerance capable of removing a channel at the empty wavelength.

27. A filtering apparatus according to claim 25, wherein the second filter has a passband comprising the omitted wavelength and a filter tolerance capable of removing a channel at the wavelength adjacent to the empty wavelength.

28. A method of adding channels to and dropping channels from a Wavelength Division Multiplexed (WDM) signal as it circulates around a ring comprising a plurality of sequential nodes, the WDM signal having a plurality of channels defined by a sequential set of wavelengths with no dead band, the method comprising at each node dropping a channel and adding an adjacent channel, the dropped channel being added in the next adjacent node.

* * * * *

UNITED STATES PATENT AND TRADEMARK OFFICE
CERTIFICATE OF CORRECTION

PATENT NO. : 6,188,816 B1
DATED : February 13, 2001
INVENTOR(S) : Alan G. Solheim Page 1 of 1

It is certified that error appears in the above-identified patent and that said Letters Patent is hereby corrected as shown below:

Column 10, claim 7,
Line 42, change "other" to -- other than --

Column 12, claim 27,
Line 54, change "filtering apparatus" to -- network --

Signed and Sealed this

Twenty-ninth Day of January, 2002

Attest:

*Attesting Officer*

JAMES E. ROGAN
*Director of the United States Patent and Trademark Office*